United States Patent
Winter et al.

(10) Patent No.: US 8,020,377 B2
(45) Date of Patent: Sep. 20, 2011

(54) APPARATUS/METHOD FOR PRODUCING HOT GAS AND DIESEL PARTICULATE FILTER SYSTEM

(75) Inventors: Thomas Winter, Oetzingen (DE); Waldemar Karsten, Wirges (DE)

(73) Assignee: TWK Engineering Entwicklungstechnik GBR, Wirges (DE)

( * ) Notice: Subject to any disclaimer, the term of this patent is extended or adjusted under 35 U.S.C. 154(b) by 783 days.

(21) Appl. No.: 12/120,066

(22) Filed: May 13, 2008

(65) Prior Publication Data
US 2008/0202105 A1    Aug. 28, 2008

Related U.S. Application Data

(63) Continuation of application No. 11/938,960, filed on Nov. 13, 2007, which is a continuation-in-part of application No. PCT/EP2007/053237, filed on Apr. 3, 2007.

(30) Foreign Application Priority Data

Apr. 3, 2006   (DE) .................. 10 2006 015 841

(51) Int. Cl.
   *F01N 3/00*   (2006.01)
(52) U.S. Cl. ............... 60/295; 60/274; 60/286; 60/300; 55/311; 55/523; 431/243; 431/353
(58) Field of Classification Search .......... 60/273–274, 60/284–287, 295–304, 310
   See application file for complete search history.

(56) References Cited

U.S. PATENT DOCUMENTS

| | | | |
|---|---|---|---|
| 3,245,457 A * | 4/1966 | Smith et al. | 431/6 |
| 3,602,621 A * | 8/1971 | Mellett et al. | 431/116 |
| 3,885,386 A | 5/1975 | Bachmann | |
| 4,012,905 A | 3/1977 | Masaki et al. | |
| 4,318,887 A | 3/1982 | Leistritz | |
| 4,538,413 A * | 9/1985 | Shinzawa et al. | 60/303 |
| 4,541,239 A | 9/1985 | Tokura | |
| 4,567,725 A * | 2/1986 | Shinzawa et al. | 60/274 |
| 4,604,868 A | 8/1986 | Nomoto et al. | |

(Continued)

FOREIGN PATENT DOCUMENTS
CA      2078096      3/1993
(Continued)

OTHER PUBLICATIONS

International Search Report published Oct. 11, 2007 for PCT/EP2007/053237 filed Apr. 3, 2007.

(Continued)

*Primary Examiner* — Thomas Denion
*Assistant Examiner* — Jesse Bogue
(74) *Attorney, Agent, or Firm* — Martin Fleit; Paul D. Bianco; Fleit Gibbons Gutman Bongini & Bianco PL

(57) ABSTRACT

The invention relates to an apparatus for producing hot gas with a first combustion chamber (2) to burn fuel (17). The first combustion chamber features an open (5) and a closed end (36), and the first combustion chamber has a fuel inlet (13) arranged at its closed end. A second combustion chamber (35) encloses the first combustion chamber, with the second combustion chamber featuring a discharge outlet (37) for the hot gas, and the second combustion chamber featuring a closed end at which an inlet for combustion air (39) is arranged.

20 Claims, 10 Drawing Sheets

U.S. PATENT DOCUMENTS

| | | | |
|---|---|---|---|
| 4,622,810 A | 11/1986 | Shinsei | |
| 4,651,524 A | 3/1987 | Brighton | |
| 4,662,172 A | 5/1987 | Shinzawa | |
| 4,731,994 A | 3/1988 | Dettling et al. | |
| 4,744,217 A | 5/1988 | Goerlich | |
| 4,858,431 A | 8/1989 | Leonhard | |
| 4,912,920 A * | 4/1990 | Hirabayashi | 60/303 |
| 4,951,464 A * | 8/1990 | Eickhoff et al. | 60/274 |
| 5,094,075 A * | 3/1992 | Berendes | 60/303 |
| 5,595,145 A | 1/1997 | Ozawa | |
| 5,826,428 A * | 10/1998 | Blaschke | 60/303 |
| 5,829,248 A * | 11/1998 | Clifton | 60/286 |
| 6,065,957 A * | 5/2000 | Kondo et al. | 431/116 |
| 6,694,727 B1 | 2/2004 | Crawley et al. | |
| 6,725,652 B2 | 4/2004 | Sakaguchi | |
| 2002/0127506 A1* | 9/2002 | Eberspach et al. | 431/262 |
| 2004/0058290 A1* | 3/2004 | Mauzey et al. | 431/243 |
| 2004/0235658 A1 | 11/2004 | Dornseiffer | |
| 2005/0153252 A1* | 7/2005 | Crawley et al. | 431/5 |
| 2008/0110157 A1 | 5/2008 | Winter | |
| 2008/0202105 A1 | 8/2008 | Winter | |

FOREIGN PATENT DOCUMENTS

| | | |
|---|---|---|
| CA | 2078096 A1 | 3/1993 |
| DE | 3545437 | 7/1987 |
| DE | 3729861 | 3/1989 |
| DE | 3734197 | 4/1989 |
| DE | 4229103 | 3/1994 |
| DE | 4243035 | 6/1994 |
| DE | 19810738 | 4/1999 |
| DE | 10005376 | 8/2000 |
| DE | 10138111 | 2/2003 |
| DE | 10130338 | 4/2003 |
| DE | 10204073 | 8/2003 |
| DE | 20023560 | 3/2005 |
| EP | 0 367 280 A1 | 5/1990 |
| EP | 0 532 030 A1 | 3/1993 |
| WO | 2007/113298 | 10/2007 |

OTHER PUBLICATIONS

International Preliminary Report on Patentability published Oct. 8, 2008 for PCT/EP2007/053237 filed Apr. 3, 2007.

Written Opinion of the International Search Authority published Oct. 3, 2008 for PCT/EP2007/053237 filed Apr. 3, 2007.

English Translation of International Preliminary Report on Patentability published Nov. 17, 2008 for PCT/EP2007/053237 filed Apr. 3, 2007.

English Translation of Written Opinion of the International Search Authority published Nov. 14, 2008 for PCT/EP2007/053237 filed Apr. 3, 2007.

Office Action from USPTO dated Mar. 4, 2011 for U.S. Appl. No. 11/938,960 (parent application).

Response to Office Action dated May 31, 2011 for U.S. Appl. No. 11/938,960 (parent application).

Examiner Interview dated Jun. 3, 2011 for U.S. Appl. No. 11/938,960 (parent application).

* cited by examiner

APPARATUS/METHOD FOR PRODUCING HOT GAS AND DIESEL PARTICULATE FILTER SYSTEM

CROSS REFERENCE TO RELATED APPLICATIONS

This application is a continuation of U.S. patent application Ser. No. 11/938,960 filed Nov. 13, 2007, which is a continuation in part of International Patent Application No. PCT/EP2007/053237, filed Apr. 3, 2007, which in turn claimed priority to German Patent Application No. 10 2006 015 841.5, filed Apr. 3, 2006. The contents of these applications are hereby incorporated by reference herein in their entirety.

FIELD OF THE INVENTION

The invention relates to an apparatus and a method for producing hot gas; in particular for the regeneration of particulate filters, and a diesel particulate filter system.

BACKGROUND OF THE INVENTION

In a diesel engine, combustion of the diesel fuel is carried out by means of self-ignition of a heterogeneous air/fuel mixture. In the event of incomplete combustion, particles are formed as a result of oxygen deficiency. The particles primarily comprise carbon (soot), sulfates and incompletely combusted hydrocarbons (HC). Diesel particulate filters for filtering out such particles are known from the prior art.

When a diesel particulate filter is used, exhaust backpressure generally rises as filter loading increases. Since the engine manufacturer does not allow the permissible exhaust backpressure to be exceeded and maintenance consisting of the filter being emptied by the customer is not desirable, passive or active regeneration of the filter is imperative.

Active diesel particulate filter systems are considered to comprise "electrical regeneration systems" or "burner-supported systems", which are actively triggered either manually or by means of an open-loop or closed-loop control unit on the basis of monitoring of the exhaust backpressure.

A system for regeneration of a diesel particulate filter is known from U.S. Pat. No. 5,094,075.

SUMMARY OF THE INVENTION

The object of the present invention is to create an improved apparatus and a method for producing hot gas, in particular for regeneration of particulate filters, and a diesel particulate filter system.

The objects of the invention are solved through the features of the main claims in each case. Preferred embodiments of the invention are indicated in the dependent claims.

According to embodiments of the invention, an apparatus is created to produce hot gas, having a first combustion chamber for fuel combustion, wherein the first combustion chamber features an open and a closed end, and a second combustion chamber, which encloses the first combustion chamber, wherein the second combustion chamber features a discharge outlet for the hot gas, which is arranged opposite the closed end of the first combustion chamber.

The invention enables, in particular, the creation of a burner for a diesel particulate filter, which features relatively high performance in a relatively small design. This is achieved by placing the first combustion chamber inside the second combustion chamber.

According to an embodiment of the invention, the first combustion chamber is designed for fuel combustion in oxygen-deficient conditions. Thus, the first combustion chamber is supplied with a fuel/air mixture having an air ratio of $\lambda<1$, i.e. a fuel/air mixture having an excess of fuel, which is also designated as a "rich mixture".

According to an embodiment of the invention, the first and second combustion chambers are formed from two sections of piping arranged one inside the other. In this case, the first combustion chamber is completely enclosed by the second combustion chamber.

According to an embodiment of the invention, an air stream is generated in the second combustion chamber, which flows in the direction of the discharge outlet of the second combustion chamber for the hot gas. Preferably, the air stream has a swirl, so that the air stream flows in an approximately spiral shape along the inner side of an outer wall of the second combustion chamber. This results in cooling of the outer wall of the second combustion chamber, so that the temperature of the outer wall reaches an operating temperature of, for example, no more than 300° C.

According to an embodiment of the invention, the air stream in the second combustion chamber is produced by an eccentrically offset air supply inlet. The air supply inlet leads, for example, into the second combustion chamber between the open end of the first combustion chamber and the closed end of the second combustion chamber. Combustion gas flowing from the first combustion chamber into the second combustion chamber is taken up by the air supply without fully mixing with it, with the result that the combustion gas is transported towards the discharge outlet following the air stream in an approximately spiral-shaped course.

According to an embodiment of the invention, the apparatus has a casing, through which the combustion air is carried. This has the advantage of making it possible to obtain a particularly cool outer wall.

According to an embodiment of the invention, the air stream has a swirl, which flows from the first combustion chamber into the second combustion chamber at the level of the supply of the combustion gas. For example, the apparatus may be developed in a kidney shape for this purpose. The advantage of this embodiment is that it is particularly compact and can be produced at low cost.

According to an embodiment of the invention, the apparatus features a fuel supply, which flows through the second combustion chamber to the first combustion chamber. Preferably, the fuel supply flows into the first combustion chamber in proximity to the closed end of the first combustion chamber. The fuel supply line can be used to hold the first combustion chamber in place within the second combustion chamber.

According to an embodiment of the invention, the air stream flows into the second combustion chamber in such a way that at least a portion of the air stream encounters the fuel supply flowing through the second combustion chamber. This cools the fuel supply in order to prevent the fuel supply from diminishing. Furthermore, the fact that a portion of the air stream and of the combustion gas encounters the fuel supply gives rise to a swirl and, as a result, to an essentially complete combustion of the excess fuel contained in the combustion gas. In this manner, a hot gas of, for example, up to 1400° C. can be produced, whereby the temperature of the hot gas can be adjusted by regulating the supply of fuel, for example.

According to an embodiment of the invention, a glow plug is located in the fuel supply line, in particular a flame glow plug. The glow plug is used to vaporize the fuel. A mixing zone is formed in the region of the glow plug in order to mix the fuel with air.

According to an embodiment of the invention, a mesh is provided in the first combustion chamber. The mesh is used to collect droplets of fuel that may be situated in the first combustion chamber on account of the Leydenfrost effect. The mesh prevents such droplets of fuel moving from the first combustion chamber into the second combustion chamber. The mesh may, for example, comprise a platinum-coated wire mesh.

According to an embodiment of the invention, a flange is situated at the discharge outlet for the hot gas, which protrudes into the flow of the combustion air and the combustion gas in order to swirl and intermingle them.

In a further aspect, the invention relates to a method for producing hot gas having the following steps: fuel combustion under oxygen-deficient conditions in a first combustion chamber, discharge of combustion gas from the first combustion chamber into a second combustion chamber in a first direction, generation of an air stream in the second combustion chamber in the direction of a discharge outlet for the hot gas of the second combustion chamber, whereby the second direction is opposed to the first direction.

According to an embodiment of the method according to the invention, a means of igniting the fuel/air mixture is switched off after a start-up phase. This is due to the fact that, during the start-up phase, the first combustion chamber is heated to such a degree that the means of ignition is no longer required in order to maintain the combustion process in the first combustion chamber. This is particularly the case if the means of enlarging the surface, for example the wire mesh, has heated up to such an extent that its temperature lies above the ignition temperature of the liquid fuel. If the means of ignition features a flame glow plug, for example, the particular advantage of the means of ignition being switched off is that it is no longer necessary to supply said means of ignition with electric energy after the start-up phase. This is especially advantageous if the electric energy to operate the flame glow plug is supplied by a battery of, for example, a heavy goods vehicle, bus or construction site vehicle.

According to a further embodiment of the invention, the first step in ending the combustion process is to switch on the glow plug once again. This causes the flame front in the first combustion chamber to be drawn towards the orifice of the fuel supply line. Furthermore, the temperature of the wire mesh is increased. The supply of fuel is then disconnected and air is injected into the fuel supply line. This causes fuel residue to be blown into the first combustion chamber, where it is burnt, so that any soot coatings and carbon deposits that may be present are eliminated.

According to embodiments of the invention, the first combustion chamber, in which fuel combustion takes place under oxygen-deficient conditions, has a means of enlarging the surface of its inner side. Enlargement of the surface of the inner side of the first combustion chamber causes the motion of fuel droplets, which may arise on account of the Leydenfrost effect, to be inhibited, so that these fuel droplets are not able to reach the second combustion chamber.

Instead, the fuel droplets are retained on the inner side of the first combustion chamber on account of its surface enlargement, where they are combusted. This causes the means of enlarging the surface to heat up. Once the means of enlarging the surface has heated up to a temperature above the ignition temperature of the liquid fuel, the means of igniting the fuel, such as the glow plug for example, can be switched off. If, for example, air bubbles subsequently occur in the supply of fuel, this will not lead to the combustion being extinguished even if the glow plug is switched off, since the fuel will be re-ignited when it encounters the heated-up means of enlarging the surface.

The means of enlarging the surface may be implemented as a wire mesh, a metal fabric or a wire cloth, which is arranged along the inner side of the first combustion chamber. Alternatively or additionally, the means of enlarging the surface may be formed as metal foam or ceramic foam, which is arranged on the inner side of the first combustion chamber.

According to an embodiment of the invention, the means of enlarging the surface is formed by upward-folded profiling of the inner side of the first combustion chamber. For example, the inner side of the first combustion chamber may have ring-shaped, zigzag-shaped or dendrite-shaped profiling.

According to an embodiment of the invention, the apparatus also has a high-pressure pump to deliver the fuel to the first combustion chamber through a nozzle. During a start-up phase, the supply of fuel takes place via the fuel inlet, which is connected to the means of igniting the fuel, whereas upon completion of the start-up phase the fuel is supplied through the nozzle.

Embodiments of the apparatus according to the invention are particularly advantageous, since the temperature in the first combustion chamber is not dependent on the performance of the burner, since the quantity of oxygen available in the first combustion chamber is predetermined, for example by means of the geometry of the bypass. Burner performance can be controlled by means of the blower speed. Furthermore, it is possible for closed-loop A/F control to be effected by means of the speed of the blower or the capacity of the fuel pump.

In a further aspect, the invention relates to a diesel particulate filter system with a particulate filter and an apparatus according to the invention for producing hot gas. In order to regenerate the particulate filter, it is exposed to the hot gas. This can take place while the engine is running (i.e. "online") or with the engine switched off.

According to an embodiment of the invention, the temperature of the hot gas is measured. The supply of fuel is regulated with the temperature as a control variable. This is advantageous in order to prevent damage to the particulate filter caused by the hot gas being too hot.

In a further aspect, the invention relates to an electronic device and a computer program product to control an apparatus according to the invention for producing hot gas.

BRIEF DESCRIPTION OF THE DRAWINGS

Embodiments of the invention are described in more detail below with reference to the drawings. The drawings comprise the following figures.

Elements of the following embodiments that correspond to each other are designated by the same reference numbers.

DETAILED DESCRIPTION OF THE INVENTION

Figure 1:
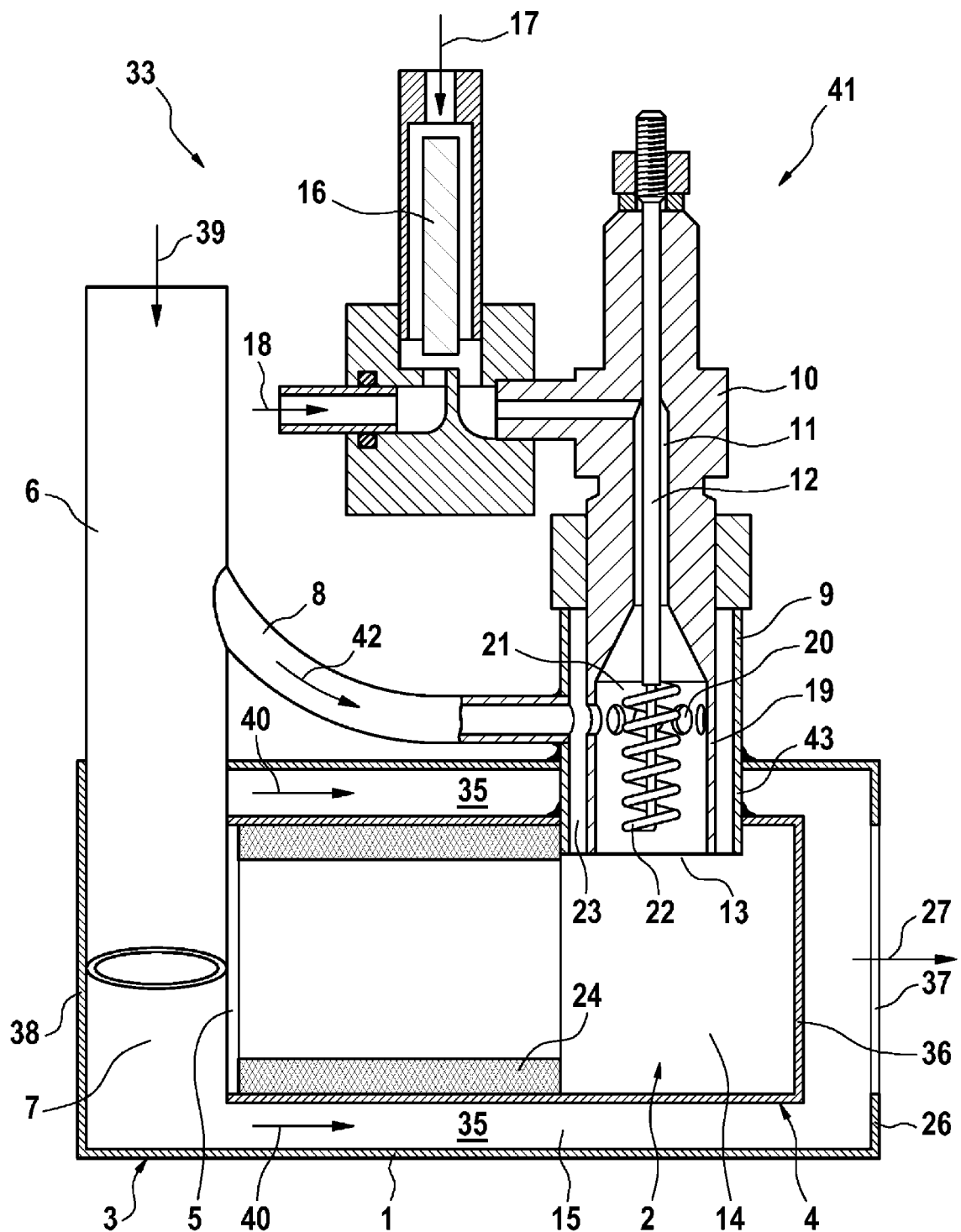
FIG. 1 a schematic longitudinal section through an embodiment of an apparatus according to the invention, FIG. 2 a schematic cross-section through the embodiment of FIG. 1 in the region of the air supply inlet, FIG. 3 a block diagram of an embodiment of a diesel particulate filter system according to the invention, FIG. 4 a flow diagram of an embodiment of a method according to the invention, FIG. 5 a flow diagram of a further embodiment of a method according to the invention, FIG. 6 an embodiment of a signal plan for actuating an embodiment of an apparatus according to the invention, FIG. 7 a schematic longitudinal section through a further embodiment of an apparatus according to the invention with a casing, FIG. 8 a schematic longitudinal section through a further embodiment of an apparatus according to the invention, FIG. 9 a perspective view of the embodiment of FIG. 8, FIG. 10 a longitudinal section of a further embodiment with an integrated particulate filter, FIG. 11 a cross-section of the embodiment of FIG. 10, FIG. 12 a perspective view of the embodiment of FIGS. 10 and 11.

FIG. 1 shows an embodiment of an apparatus according to the invention for producing hot gas, i.e. a burner 33. Burner 33 has a first combustion chamber 2 and a second combustion chamber 35. Combustion chamber 2 has an open end 5 and a closed end 36.

In the embodiment shown here, second combustion chamber 35 completely encloses first combustion chamber 2. Second combustion chamber 35 has a discharge outlet 37 for hot gas 27. Discharge outlet 37 of second combustion chamber 35 is arranged opposite closed end 36 of first combustion chamber 2.

In the example embodiment shown here, combustion chambers 2 and 35 are formed by two sections of piping arranged concentrically one inside the other, i.e. by outer pipe 3 and inner pipe 4. Outer pipe 3 has a closed end 38 on its side opposite to discharge outlet 37.

A combustion air pipe 6 leads into second combustion chamber 35 in an eccentrically offset position, specifically into a region between closed end 38 and open end 5. Combustion zone 7 is formed in this region. Combustion air pipe 6 forms an inlet for combustion air 39. This inlet is situated at closed end 38 of second combustion chamber 35, i.e. directly adjacent to closed end 38 or in proximity to closed end 38.

Combustion air 39 is conveyed by means of combustion air blower 28 (cf. FIG. 3) through combustion air pipe 6 into combustion zone 7. In this context, "combustion air" refers to an oxygen-containing gas, such as, for example, ambient air or a different oxygen-containing gas.

When combustion air 39 flows through combustion air pipe 6 into the combustion zone, this causes an air stream 40 to be produced in the direction of discharge outlet 37. Preferably, air stream 40 flows along an inner side of a wall 1 of outer pipe 3. Preferably, air stream 40 features a swirl around the longitudinal axis of outer pipe 3 and inner pipe 4. This swirl is produced by the off-centre influx of combustion air 39 into combustion zone 7 via combustion air pipe 6. This shall be described in more detail with reference to FIG. 2.

Burner 33 has a fuel supply 41. Fuel supply 41 is used to supply a fuel/air mixture to first combustion chamber 2 via a fuel inlet, which is formed by an orifice 13 of glow plug tube 9. Orifice 13 is situated at closed end 36 of first combustion chamber 2, i.e. directly adjacent to closed end 36 or in proximity to closed end 36.

For this purpose, fuel supply 41 has a glow plug tube 9, which leads into combustion chamber 2 near to closed end 36. In the embodiment shown here, glow plug tube 9 is connected to combustion air pipe 6 via a bypass 8. An air stream 42 can therefore flow into fuel supply 41 through bypass 8.

Glow plug tube 9 has a section 43, which proceeds through combustion chamber 35 through to combustion chamber 2. This is used to convey the fuel/air mixture through combustion chamber 35 and through to combustion chamber 2.

As an example, glow plug tube 9 may be welded to outer pipe 3 in the region of its passage through outer pipe 3 and welded to inner pipe 4 in the region of its passage through inner pipe 4, thereby holding inner pipe 4 in place within outer pipe 3. Hence, glow plug tube 9 is used to fasten inner pipe 4 to outer pipe 3. Alternatively or additionally, further fastening means may be provided to secure inner pipe 4 within outer pipe 3.

A flame glow plug is inserted in glow plug tube 9. This may comprise a standard flame glow plug, for example from the manufacturer BERU, in particular of the type FR20 24V. Flame glow plug 10 has a fuel channel 11, which is connected to a 3/2-way solenoid valve 16. Solenoid valve 16 provides the option of conveying either fuel 17 or scavenging air 18 into flame glow plug 10 in order to clear fuel channel 11.

When solenoid valve 16 is positioned accordingly, fuel 17 runs along a glow pin 12 of flame glow plug 10 into mixing zone 21, which is enclosed by an internal conduit 19 of flame glow plug 10. Internal conduit 19 has holes 20, via which a portion of air stream 42 can enter mixing zone 21. In mixing zone 21, this portion of air stream 42 is mixed together with fuel 17, which enters mixing zone 41 via fuel channel 11, thereby giving rise to a fuel/air mixture. Fuel 17 and the fuel/air mixture, respectively, can be ignited by a hot wire 22 of flame glow plug 10.

Internal conduit 19 has a slightly smaller cross-section than glow plug tube 9, meaning that a gap 23 is formed in the region of section 43. A portion of air stream 42 does not flow into mixing zone 21 via holes 20, but instead flows through gap 23 via section 43 into combustion chamber 2. A cooling duct is formed by gap 23 between internal conduit 19 and glow plug tube 9. This portion of air stream 42 cools glow plug tube 9, thereby protecting glow plug tube 9 and the body of glow plug 10 from overheating.

On account of the off-center delivery of combustion air 39 through combustion air pipe 6, air stream 40 features a swirl around the longitudinal axis of outer pipe 3 and inner pipe 4. Preferably, the swirl is chosen so that a large portion of air stream 40 impinges upon glow plug tube 9 in the region of section 43. This causes glow plug tube 9 to additionally be significantly cooled. Furthermore, this causes air stream 40 to be swirled and intermingled with the combustion gas that has been produced in combustion chamber 2. Further swirling and intermingling takes place in the region of discharge outlet 37, specifically at flange 26 of burner 33. On account of the swirl at section 43 and flange 26, the combustion gas is therefore mixed with air stream 40, with the result that the hitherto uncombusted fuel of the combustion gas is combusted.

The eccentric inflow of combustion air 39 causes air stream 40 to proceed in an approximately spiral-shaped course along the inner side of wall 1 of outer pipe 3. In this process, air stream 40 is essentially laminar until it encounters section 43. Thus, in combustion chamber 35, the relatively cool combustion air 39 flows as air stream 40 along the inner side of wall 1, so that the flame of the burning combustion gas, which moves from combustion chamber 2 to combustion chamber 35, is kept away or "blown away" from the inner side of wall 1. The advantage of this is that wall 1 of outer pipe 3 is cooled, while inner pipe 4 is heated by the flame of the combustion gas.

In addition to being cooled by air stream 40, which essentially impacts upon glow plug tube 9 in the region of section 43, flame glow plug 10 is also cooled by the flow and the at least partial vaporization of fuel 17 in fuel channel 11.

A wire mesh 24 is arranged on the inner side of combustion chamber 2, i.e. on the inner side of inner pipe 4. For example, the wire mesh may be arranged between open end 5 and orifice 13 of glow plug tube 9 in combustion chamber 2. The wire mesh should be close-meshed enough to ensure that liquid fuel 17 is not blown out of combustion chamber 2, but is instead drawn upwards along wire mesh 24 by means of capillary action. The platinum coating on wire mesh 24 serves to increase the temperature of inner pipe 4 during the combustion process. When burner 33 is shut down, this causes any fuel vapors that may still be present or that may occur to be catalytically oxidized when flame glow plug 10 is extinguished.

During the combustion process, solenoid valve 16 is set in such a way that fuel 17 reaches mixing zone 21 via fuel channel 11 of flame glow plug 10, whereupon a rich fuel/air mixture is produced in said mixing zone 21 on account of the mixing with a portion of air stream 42, which enters mixing zone 21 through holes 20. Said fuel/air mixture proceeds to combustion chamber 2 through section 43 of glow plug tube 9. The resulting combustion gas moves through open end 5 of combustion chamber 2 into combustion zone 7. Combustion air 39 flows through combustion air pipe 6 into combustion chamber 35, where the result is air stream 40. This also takes up the combustion gas, which flows out of open end 5 of combustion chamber 2 into combustion chamber 35. Thanks to the swirling and intermingling with air stream 40 at section 43 and at flange 26, the combustion gas is fully combusted, thereby causing hot gas 27 to be produced, which exits through discharge outlet 37 of burner 33. In this process, the oxygen flow (i.e. the rate at which oxygen is supplied to combustion chamber 35 via combustion air 39) is adjusted in such a way that the combustion of the combustion gas is carried out in combustion chamber 35 with excess oxygen, with the result that hot gas 27 contains oxygen.

In combustion chamber 2, fuel 17 burns, for example, at a temperature of approx. 500° C.-600° C. under oxygen-deficient conditions. As a result of the cooling of outer pipe 3, in particular by air stream 40, outer pipe 3 is cooler than inner pipe 4. For example, the operating temperature of outer pipe 3 may lie below 350° C., preferably in a region between 200° C. and 300° C. For example, the operating temperature at closed end 38 may be approx. 200° C. and around 300° C. in the region of glow plug tube 9, while flame glow plug 10 itself has a temperature of approx. 40° C. This is particularly advantageous for enabling trouble-free installation of the burner, for example in the diesel particulate filter system of a vehicle.

Depending on the choice of operating parameters of burner 33, hot gas 27 can reach a temperature of up to approx. 1400° C. If hot gas 27 is to be used for regeneration of a particulate filter, the desired temperature generally lies between 400° C. and 700° C. To oxidize the soot in the particulate filter, it is necessary for hot gas 27 to contain oxygen. To achieve this, the combustion of the combustion gas in combustion chamber 35 should be carried out at an air ratio of $\lambda > 1.5$.

By regulating the supply of fuel 17, it is possible to control the temperature of hot gas 27 with an optimum setting of the air ratio. This enables a hot gas rich in oxygen to be made available for oxidation of the soot particles in the particulate filter.

When operating the burner, the Leydenfrost effect may result in fuel droplets forming in combustion chamber 2. These are collected by wire mesh 24 and combusted there under oxygen-deficient conditions.

On account of inner pipe 4 being heated up, flame glow plug 10 can be switched off after a start-up phase of burner 33, since it is no longer required to maintain the combustion process subsequent to the start-up phase. This has the particular advantage that the battery of the vehicle need not be constantly burdened with operation of flame glow plug 10 during operation of burner 33.

In addition to the start-up phase, flame glow plug 10 is preferably also switched on in the shutdown phase of burner 33, as described in more detail below.

Figure 2:
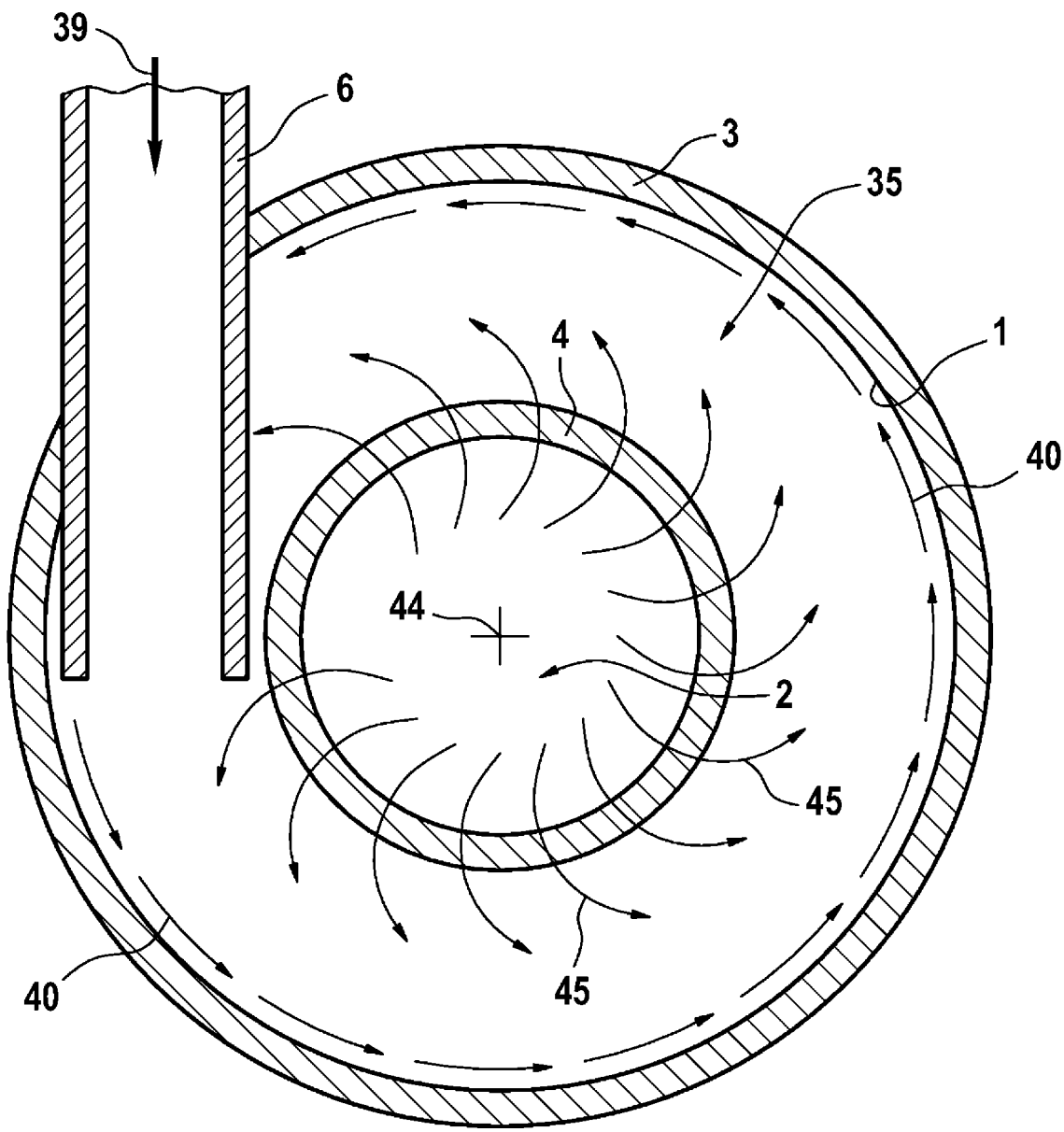

FIG. 2 shows a cross-section through burner 33 in the embodiment of FIG. 1 in the region of combustion zone 7.

As shown schematically in FIG. 2, air stream 40 along the inner side of wall 1 is effected by combustion air 39 being introduced eccentrically into combustion chamber 35 through combustion air pipe 6. This air stream 40 is essentially laminar and its direction has both a rotary component around longitudinal axis 44 of burner 33 and a translational component in the direction from closed end 38 towards discharge outlet 37. Overall, this gives air stream 40 an approximately spiral-shaped course, so that as large a portion as possible of air stream 40 impacts upon glow plug tube 9 in section 43 (cf. FIG. 1). One of the consequences of this is that flame glow plug 10 is made significantly cooler.

Combustion gas 45 moves from combustion chamber 2 to combustion chamber 35. This combustion gas 45 is taken up by the combustion air flowing into combustion chamber 35, without becoming fully intermingled with said combustion air, with the result that the combustion gas, following the path of air stream 40, is also conveyed in an approximately spiral-shaped course rotationally and translationally in the direction of the discharge outlet.

Air stream 40 causes combustion gas 45 to be blown away from wall 1, so that the flame of the combustion gas cannot reach wall 1. This results in inner pipe 4 being heated up more than outer pipe 3.

Figure 3:
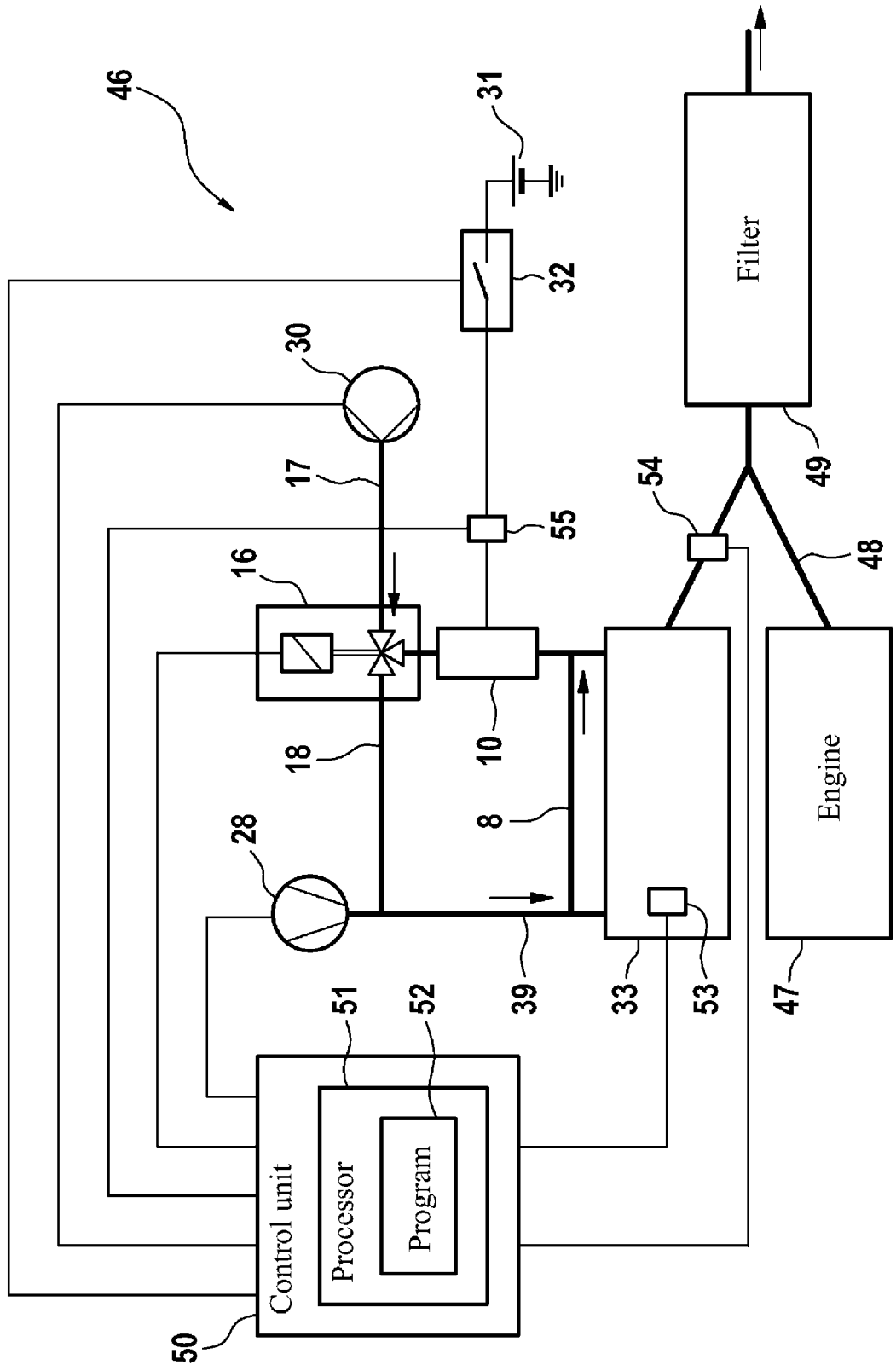

FIG. 3 shows an embodiment of a diesel particulate filter system 46 according to the invention. The elements of FIG. 3 that correspond to elements in FIGS. 1 and 2 are designated by the same reference numbers.

Burner 33 and a diesel engine 47 are connected to a particulate filter 49 via Y-tube 48. Particulate filter 49 is used to filter out soot particles from the exhaust gases of diesel engine 47. The soot particles filtered out by filter 49 are, where required, burnt with the aid of hot gas 27 supplied by burner 33. This can be carried out "online" (i.e. when diesel engine 47 is running) or after switching off diesel engine 47. To effect regeneration of particulate filter 49 (i.e. to combust the soot particles), burner 33 is switched on manually or automatically.

In order to effect open-loop and/or closed-loop control of burner 33, a control unit 50 is used, having at least a processor 51 to execute the program instructions of a program 52. Control unit 50 is used to control a combustion air blower 28, which blows in combustion air 39 through combustion air pipe 6 (cf. FIG. 1). Furthermore, control unit 50 is used to control solenoid valve 16, diesel fuel supply pump 30 and switch 32.

In the embodiment shown here, scavenging air 18, where required, is also supplied by combustion air blower 28, which is connected to an opening of solenoid valve 16 for this purpose. The other opening of solenoid valve 16 is connected to diesel fuel supply pump 30 in order to supply fuel 17, which is diesel fuel in the case under consideration here. Flame glow plug 10 can be connected to power source 31 using switch 32. Power source 31 could comprise a car battery, for example.

Furthermore, control unit 50 can be connected to a sensor 53 (i.e. a so-called flame detector) and/or a current sensor 55 to monitor flame glow plug 10. Sensor 53 is used to ascertain whether fuel combustion is taking place or not, i.e. whether burner 33 has ignited or not. Current sensor 55 is used to ascertain whether flame glow plug 10 is being heated up or has failed due to a defect. This is a means of ensuring that no fuel is pumped into burner 33 if said fuel cannot be ignited in the event of a malfunction or if combustion has ceased. In such cases, control unit 50 switches off the fuel supply by switching off diesel fuel supply pump 30.

The control unit can also be connected to a temperature sensor 54, which measures the temperature of hot gas 27 prior to particulate filter 49. By controlling diesel fuel supply pump 30, control unit 50 can regulate the supply of fuel 17 in such a way that a desired temperature of hot gas 27 is achieved. In this context, the setpoint temperature can be specified as being dependent upon the particulate filter 49 being used and stored in control unit 50. Should the actual temperature measured by temperature sensor 54 fall below the setpoint temperature, the flow rate of diesel fuel supply pump 30 is increased in such a way that the desired temperature of hot gas 27 is achieved.

Figure 4:
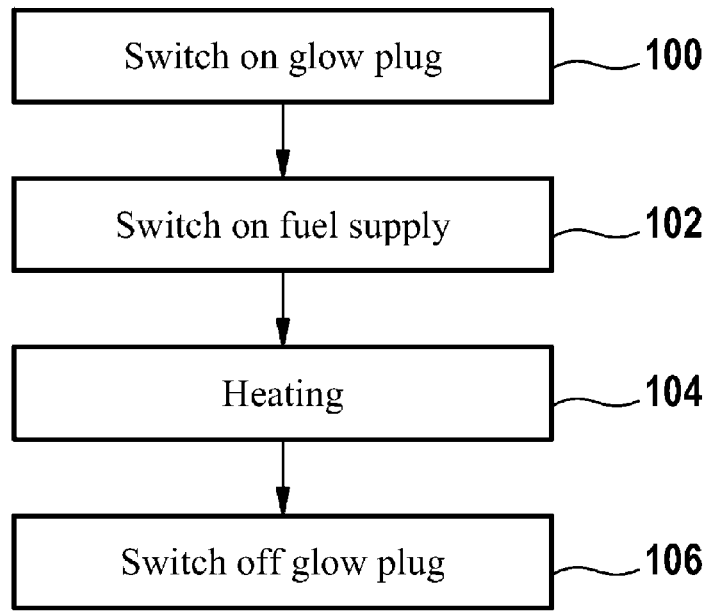
Figure 5:
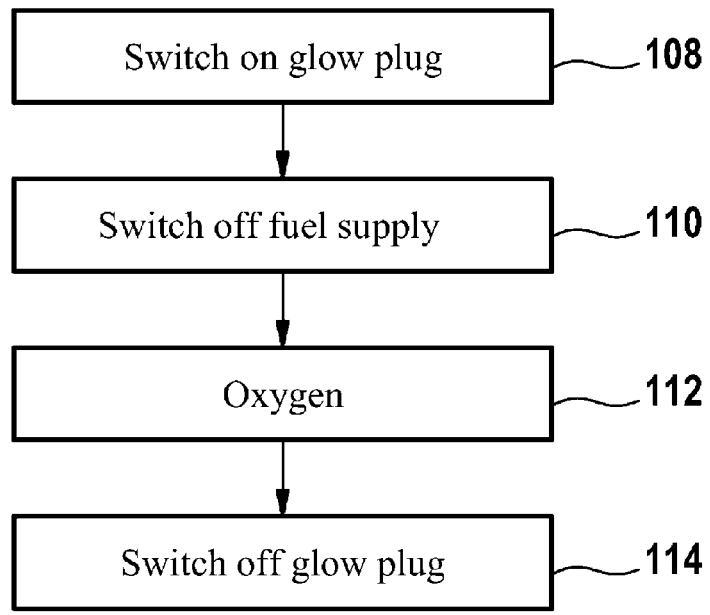
Figure 6:
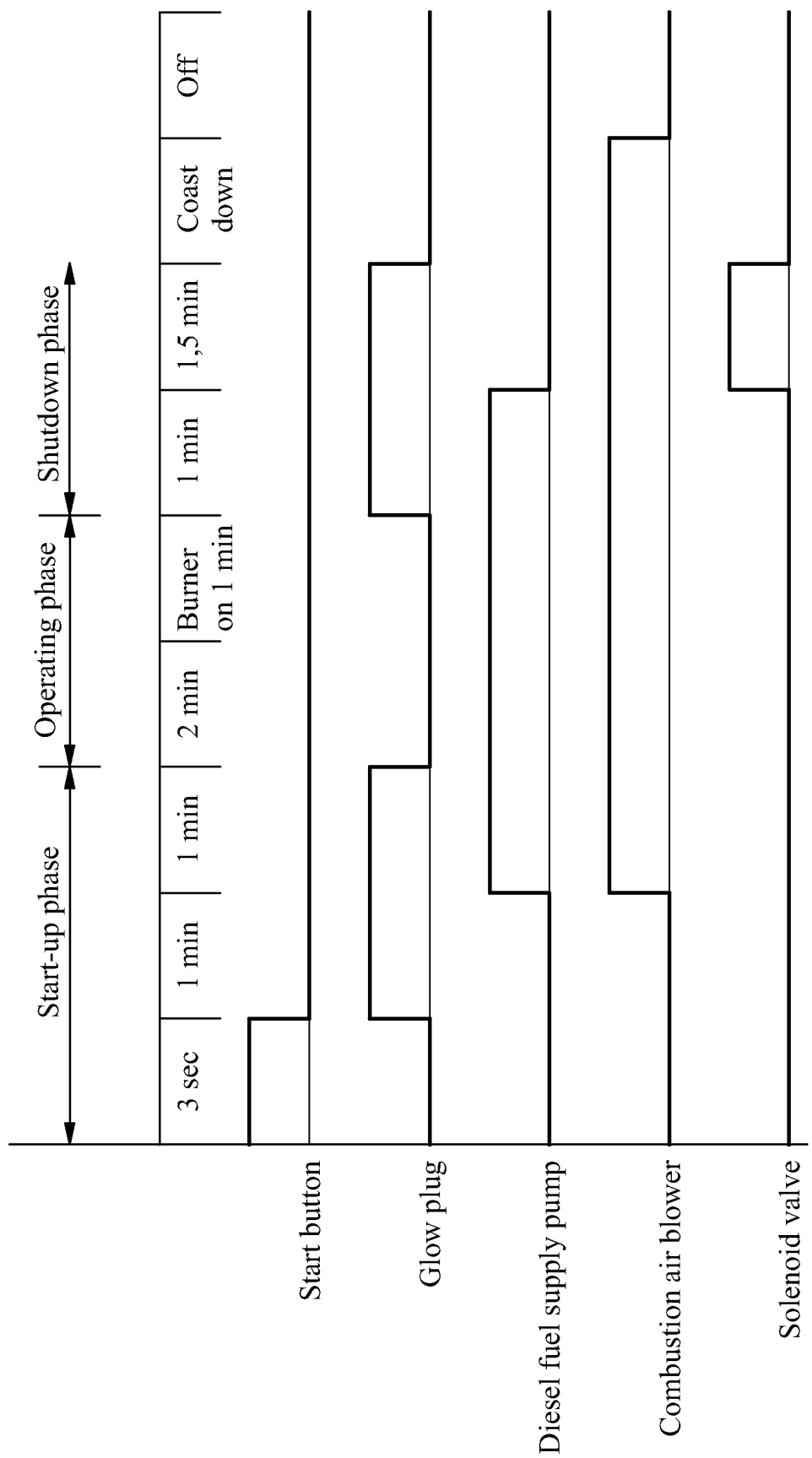

The following sections employ FIGS. 4 to 6 to provide more detailed descriptions of various possible operating modes of diesel particulate filter system 46.

FIG. 4 shows the start-up process for burner 33 according to an embodiment of the invention. In step 100, control unit 50 actuates switch 32 in order to connect flame glow plug 10 to power source 31. The control unit then actuates solenoid valve 16 and diesel fuel supply pump 30, with the result that fuel is pumped into flame glow plug 10 through fuel channel 11. In addition, control unit 50 actuates combustion air blower 28, with the result that air stream 40 and air stream 42 are produced. This causes a fuel/air mixture to be produced in mixing zone 21, which is ignited by flame glow plug 10. Hence, in step 104, combustion of this fuel/air mixture takes place under oxygen-deficient conditions in combustion chamber 24, which results in inner pipe 4 being heated up. As soon as inner pipe 4 has reached a sufficiently high temperature, the flame glow plug is switched off in step 106 by control unit 50 by means of a break pulse for switch 32, since the combustion in inner pipe 4 is self-sustaining on account of its temperature. One of the particular advantages of this is that the charge of power source 31 can be conserved.

After the start-up phase, inner pipe 4 reaches an operating temperature of, for example, between 500° C. and 600° C. Fuel 17 continues to be delivered in the operating phase. Depending on the type of diesel fuel supply pump 30, this is carried out either intermittently or continuously. Due to the temperature of inner pipe 4 and with the support of platinum-coated wire mesh 24, the combustion in inner pipe 4 is self-sustaining.

Fuel 17 runs through fuel channel 11 along the hot glow pin of flame glow plug 10 and a portion of it is already vaporized at this point. This suffices in order to have enough fuel available in the start-up phase at hot wire 22 in mixing zone 21 in the vapor phase to ignite the combustion.

In the start-up phase, fuel 17 vaporizes in flame glow plug 10 and is ignited at the glow pin. As a result, the flame is deeper within inner pipe 4, which results in this being heated up more. After a few seconds, the temperature of inner pipe 4 is sufficiently high to vaporize pumped fuel 17 independently without the support of flame glow plug 10. Thus, in the operating phase, the fuel does not vaporize until approximately somewhere between the middle and open end 5 of inner pipe 4, with the result that the temperature of wire mesh 24 decreases, which has the advantage of increasing the service life of the platinum coating.

Both in the start-up phase and in the subsequent operating phase, and especially in the event of a high flow rate of fuel 17 to produce high burner performance, droplets of unvaporized fuel 17 may occur in or on inner pipe 4, in particular due to the occurrence of the Leydenfrost phenomenon. Such droplets of unvaporized fuel 17 are absorbed by wire mesh 24. Thanks to the large surface and high temperature of wire mesh 24, the absorbed fuel 17 vaporizes and combusts.

If burner 33 is constructed with wire mesh 24, a higher burner capacity can be achieved than without the wire mesh. For example, burner 33 without the wire mesh can be operated at a burner capacity of up to 4 kW, whereas significantly higher burner capacities of 30 kW or more are possible with wire mesh 24.

Preferably, adjustment of the burner capacity is solely effected by means of controlling the rate at which fuel 17 is supplied. The combustion air blower 28 is continuously operated at full capacity in this case.

In the shutdown phase, burner 33 is shut down by firstly re-activating flame glow plug 10 by delivering a trigger pulse from control unit 50 to operate switch 32. This causes the flame front within inner pipe 4 to be moved in the direction of orifice 13. In this context, the temperature, in particular of wire mesh 24, is increased to approx. 700° C. to 800° C. After this increase in temperature, the supply of fuel 17 is switched off by control unit 50, for example by switching off diesel fuel supply pump 30. Control unit 50 actuates solenoid valve 16, with the result that scavenging air 18 is released for blowing into fuel channel 11 (steps 110, 112). Scavenging air 18 blows any fuel residue that may be present into mixing zone 21 and into combustion chamber 24 and feeds it to the combustion at wire mesh 24. Any soot coatings and carbon deposits that may be present in flame glow plug 10 are eliminated by this means. To cool burner 33, scavenging air 18 and, where required, combustion air 39 as additional cooling air, can continue to be blown in for a certain amount of time.

FIG. 6 shows an embodiment of a corresponding signal plan. After activating a start button to switch on burner 33, flame glow plug 10 is switched on by switch 32. Monitoring of flame glow plug 10 is carried out by current sensor 55, for example. During the glow phase, this must provide the logic one signal, which indicates that flame glow plug 10 is actually being heated up. If current sensor 55 provides the logic zero signal, there is a malfunction and fuel 17 is not being supplied.

Approx. 1 minute after switching on flame glow plug 10, diesel fuel supply pump 30 and combustion air blower 28 are switched on, with the result that fuel 17 and air stream 42 are conveyed to mixing zone 21, where the resulting fuel/air mixture is ignited by the glow plug. Preferably, combustion air blower 28 is switched on shortly before diesel fuel supply pump 30, so that air stream 42 is already available when fuel 17 reaches mixing zone 21. After a further minute, inner pipe 4 has heated up to such an extent that flame glow plug 10 is switched off by control unit 50. This concludes the start-up phase of the burner. During the subsequent operating phase, the combustion process in the burner is self-sustaining while diesel fuel supply pump 30 and combustion air blower 28 continue to run. Sustainment of the combustion process is monitored with the aid of sensor 53.

During the operating phase, this must provide the logic one signal, which indicates that combustion is actually taking place in burner 33. Should sensor 53 provide the logic zero signal, this indicates there is a malfunction and the supply of fuel 17 is stopped.

To shut down burner 33, flame glow plug 10 is re-activated by control unit 50, in particular in order to increase the temperature of wire mesh 24. Approx. one minute after re-activating flame glow plug 10, diesel fuel supply pump 30 is switched off and solenoid valve 16 is actuated by control unit 50 in a way that now causes scavenging air 18 to flow into fuel channel 11. As a result, fuel residues and soot are blown into inner pipe 4, so that they can be fully combusted there, in particular at wire mesh 24. Flame glow plug 10 is switched off after a further approx. 1.5 minutes. Optionally, air can continue to be blown into burner 33 in a subsequent phase in order to cool down the burner.

Figure 7:
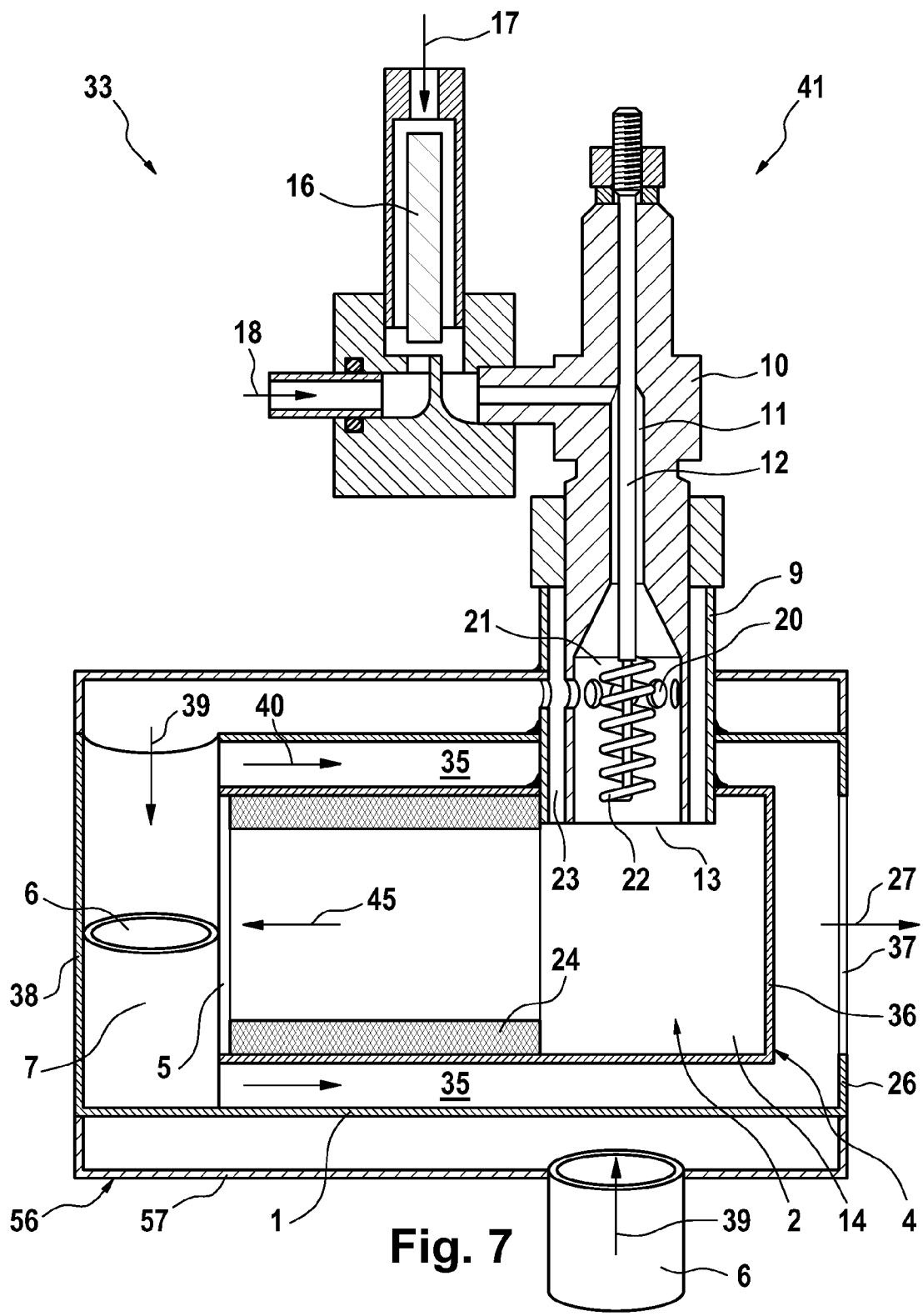

FIG. 7 shows a further embodiment of a burner 33 according to the invention. In this embodiment, burner 33 has a casing 56, which at least partially encloses first and second combustion chambers 2, 35. Combustion air 39 is conveyed through casing 56. For this purpose, combustion air pipe 6 is not positioned directly on wall 1 of combustion chamber 35, but instead on casing 56. Combustion air 39 therefore flows around wall 1 before entering combustion zone 7. The advantage of this is that outer wall 57, which is formed by casing 56, is particularly cool.

Figure 8:
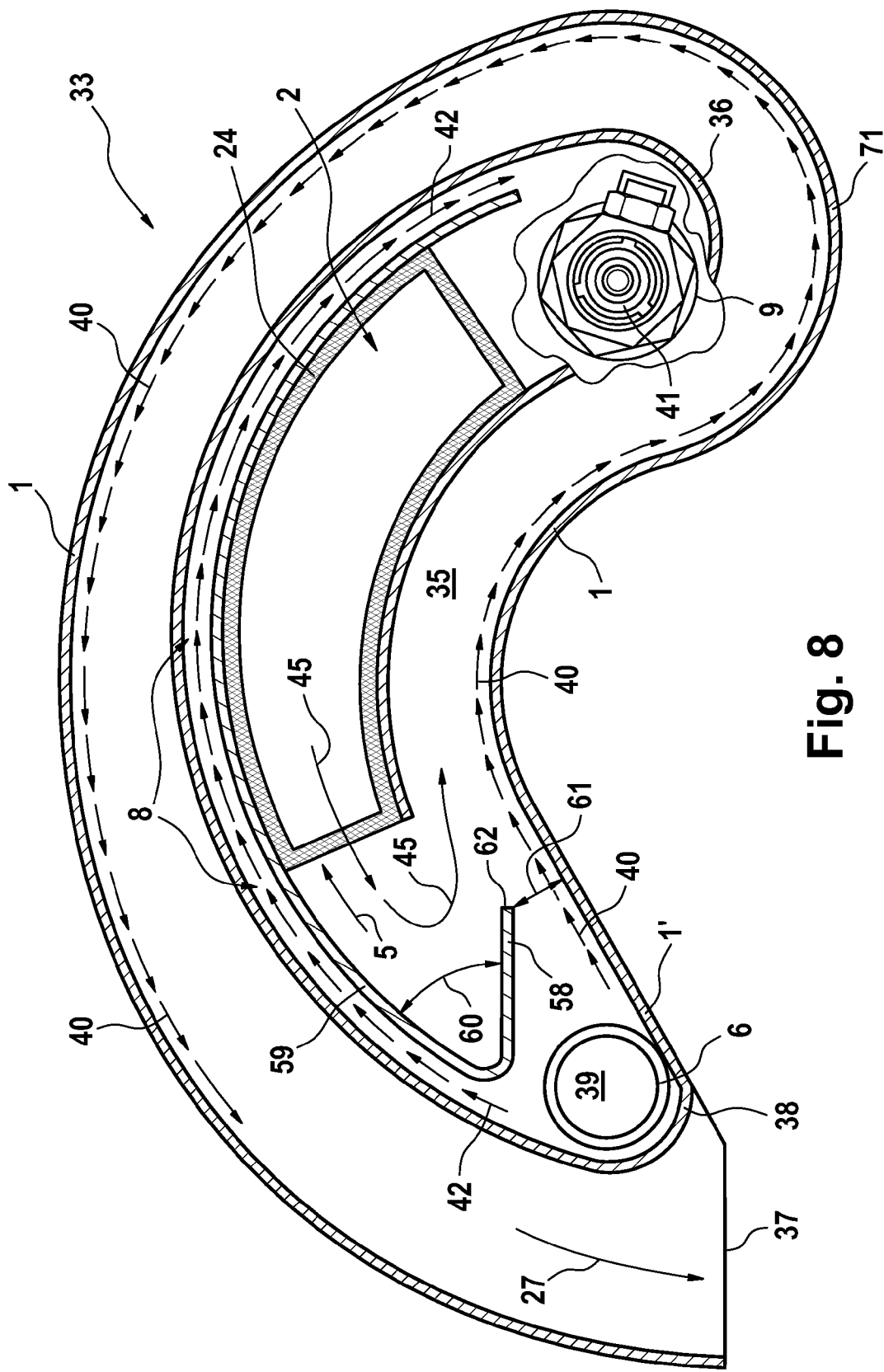

FIG. 8 shows a further embodiment of a burner 33 according to the invention. In this embodiment, air stream 40 and combustion gas 45 are set into a swirl around the direction of the fuel supply and the direction of the supply of combustion air 39 as a result of the shape of second combustion chamber 35. One or more flow baffle elements 58 can be arranged at open end 5 of combustion chamber 2 for this purpose. The shape of second combustion chamber 35 can be approximately kidney-shaped, as shown in FIG. 8.

The at least one flow element 58 forms the end section of bypass wall 59 in the direction of combustion air pipe 6. This results in flow element 58 and bypass wall 59 forming an angle 60, which preferably lies in the region between 45 degrees and 90 degrees, and more preferably between 55 degrees and 70 degrees. Angle 60 and the length of the flow element determine the size of combustion air gap 61, which preferably lies in the region of between 5 mm and 7 mm between wall section 1 of wall 1 of the burner and end 62, which points in the direction of wall section 1', of flow element 58. Wall section 1' comprises that section of wall 1, which lies opposite end 62 of flow element 58. A portion of combustion air 39 flows through combustion air gap 61, giving rise to air stream 40. The remaining portion of combustion air 39 flows through bypass 8 as air stream 42.

With a predetermined burner geometry, it is possible to use angle 60 to set the temperature and excess air of hot gas 27, related to a specific quantity of fuel 17 introduced through fuel supply 41 (cf. FIG. 1), through the division of the flow of combustion air 39 into bypass 8 and into air stream 40 to combustion chamber 35. The smaller gap 61 is chosen to be, the higher the temperature of hot gas 27. A region of angle 60 lying between 57 degrees and 63 degrees has proved to be particularly advantageous. Thus, by changing angle 60, the burner can be adjusted to the specific conditions required to regenerate the downstream filter.

In the embodiment shown here, air stream 40 is diverted by, for example, approx. 180 degrees on account of a bend 71 of wall 1, with the result that, after passing bend 71, air stream 40 is no longer flowing in the opposite direction to that in which combustion gas 45 moves from first combustion chamber 2 to second combustion chamber 35. On account of this geometry, bypass 8 is situated on the inside of burner 33.

Figure 9:
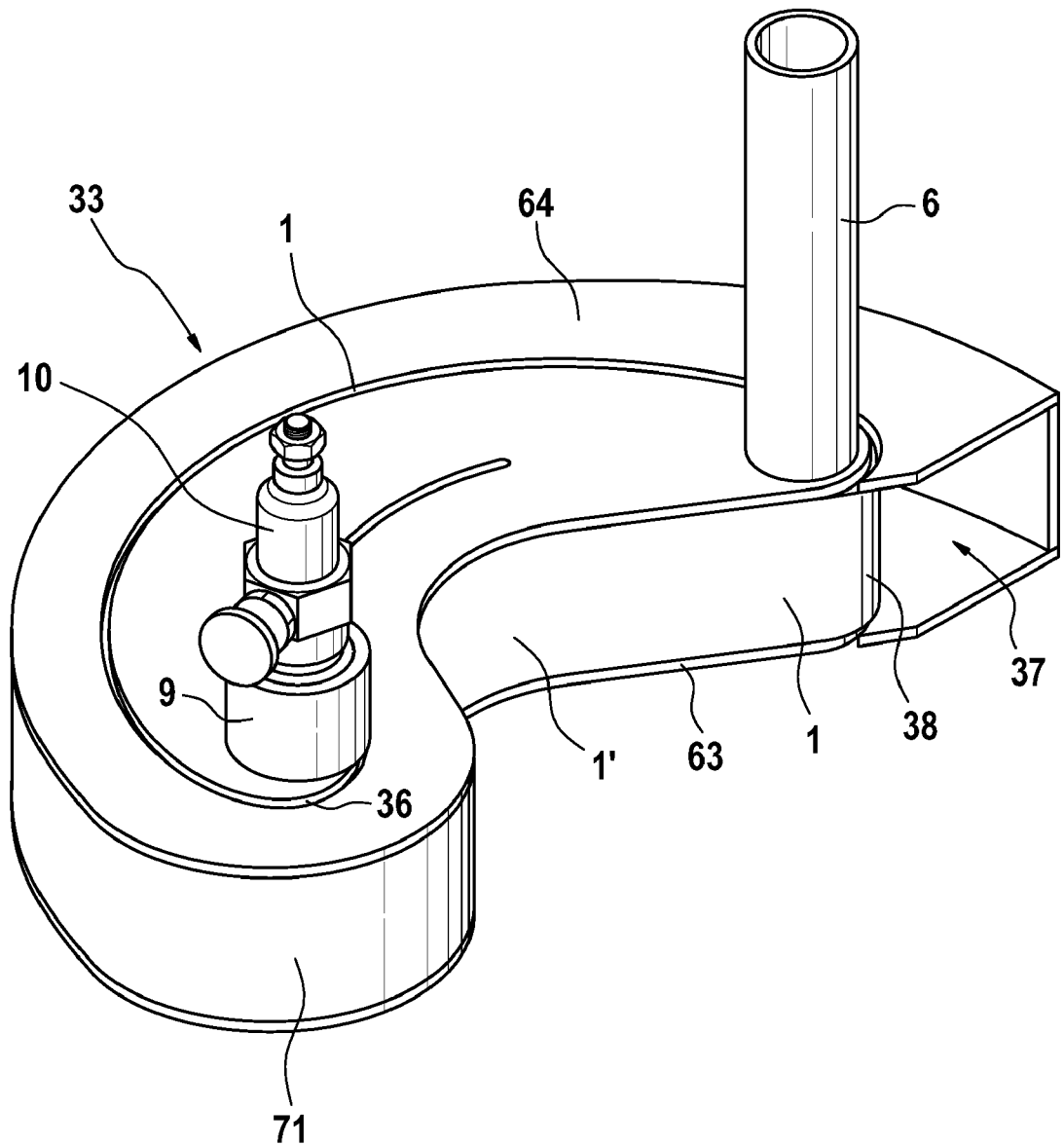

One advantage of a burner in the design according to FIG. 8 is its simple manufacturability. Wall 1 is produced from a stainless steel strip as a continuous bent component and welded into or onto a base plate 63 (as shown in FIG. 9). In a further operation, bypass wall 59 is welded in as a further element, whereby flow element 58 is incorporated in such a way that angle 60 is changeable, and can therefore be adjusted. Wire mesh 24 is inserted in combustion chamber 2 so that it is situated all the way around against the four walls. Finally, cover 64, which contains combustion air pipe 6 and glow plug tube 9, is welded on. The burner is now ready for use.

In a modification of the embodiment according to FIG. 8, a positioner (e.g. a screw) is mounted on flow baffle element 58, which leads through to the exterior through wall 1 in the region of section 1', thereby enabling adjustment of angle 60 even during operation and thus continuous modification of the burner properties, e.g. by regulating the excess air of hot gas 27 using a lambda sensor or by regulating the temperature of the hot gas.

Figure 10:
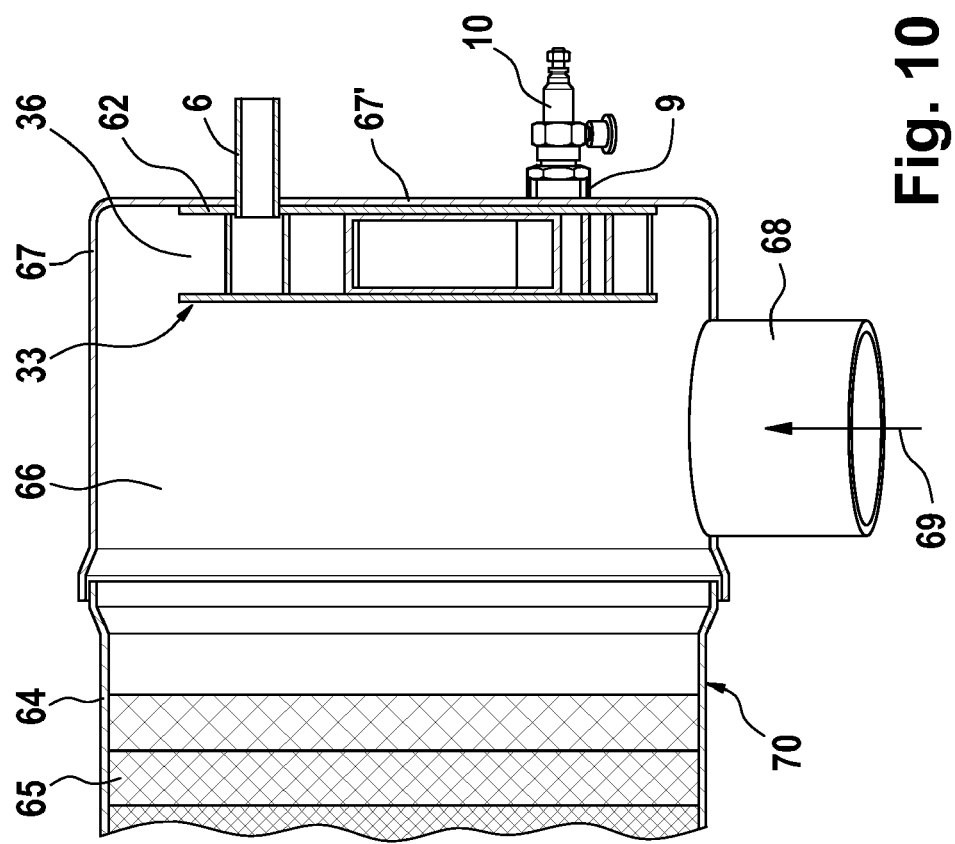
Figure 11:
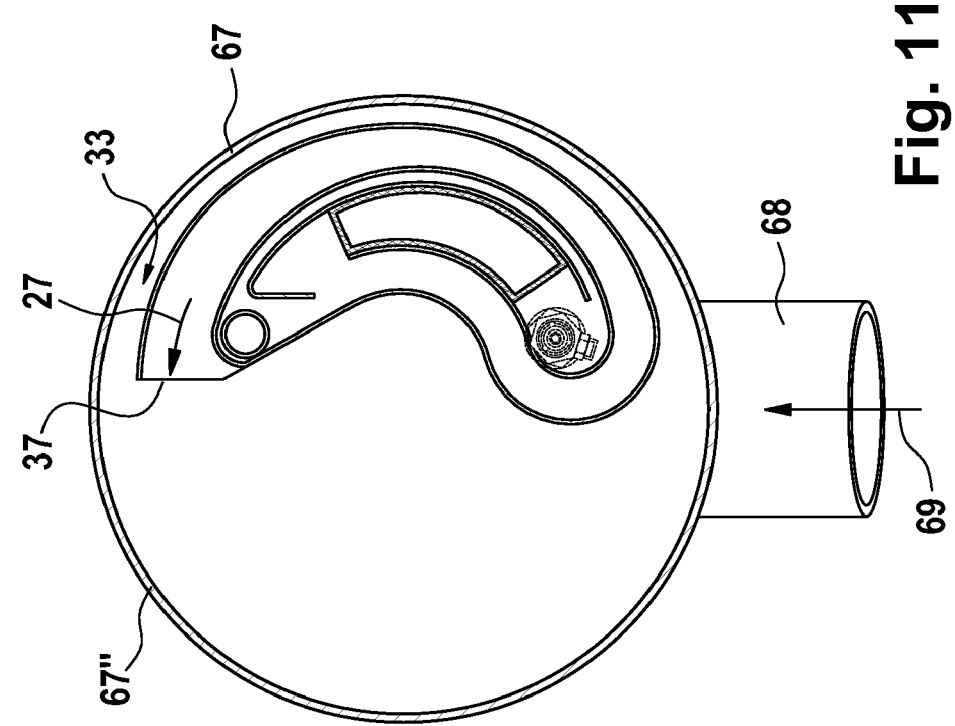
Figure 12:
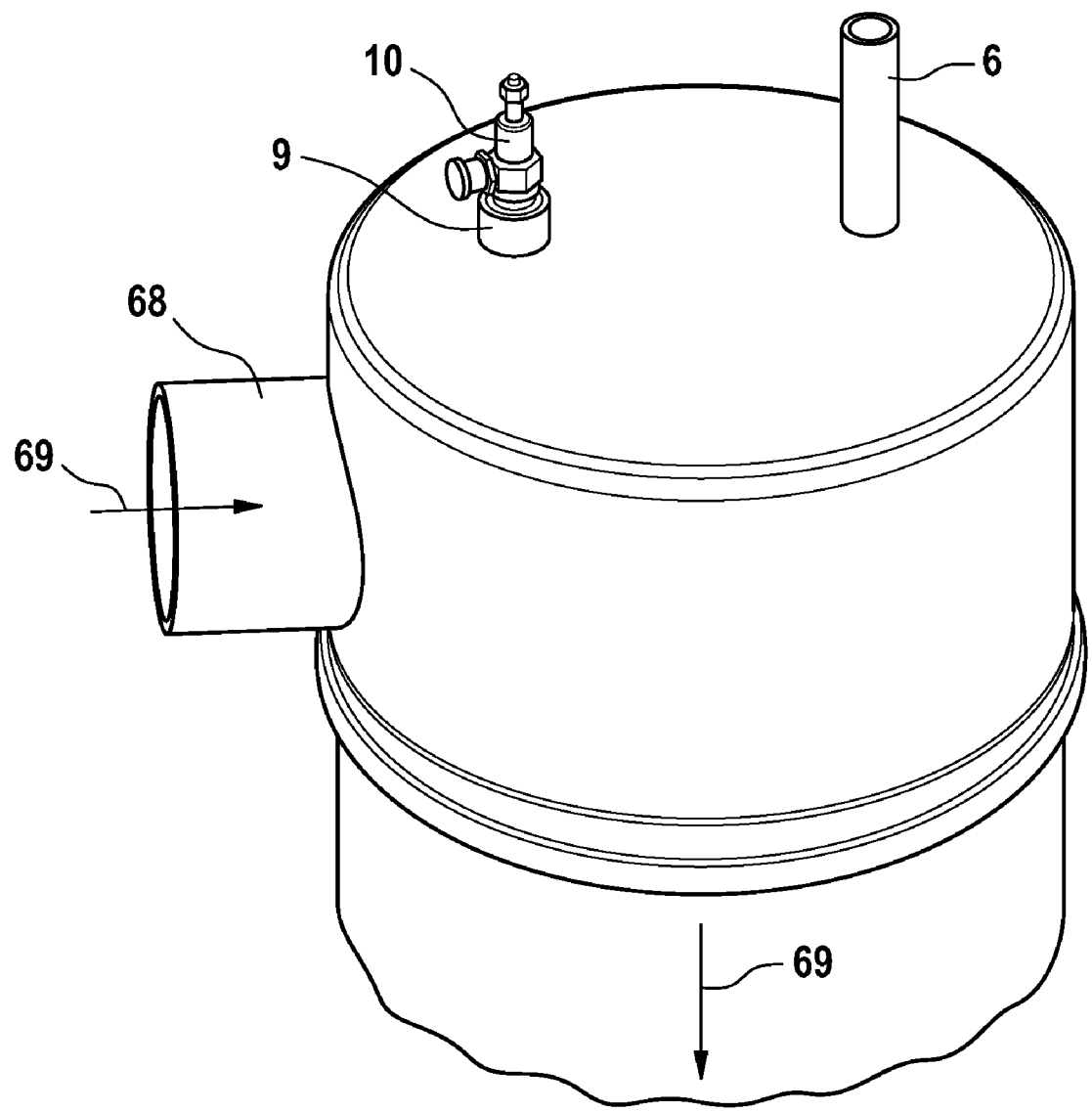

The embodiment of the burner according to FIG. 8 is characterized by its compactness and low overall height. Burners having an overall height of 35 mm have been operated successfully. The compactness makes it possible to integrate this type of burner in the input module of a filter. This enables a particularly space-saving construction of a diesel particulate filter with an integrated regeneration burner. As well as featuring high reliability in terms of its regenerating effect, such a construction is particularly characterized by its robust design and insensitivity to vibrations. These particularly occur in hard usage of off-road vehicles, such as construction vehicles, for example. FIGS. 10, 11 and 12 show a construction of this type.

Thanks to the kidney-shaped construction of the burner, the exhaust pipe can be placed centrally in the input module. A further advantage of the kidney-shaped burner in the input module is the shielding this provides against the high surface temperature that arises in the combustion process.

FIG. 10 shows a section through the input zone of a diesel particulate filter 17. Filter housing 64 contains a filter assembly 65, which filters out the soot particles in exhaust gas stream 69. Exhaust gas stream 69 is fed into input module 66 through exhaust pipe 68 in wall 67 of input module 66. Burner 33 is welded onto the inside of front wall 67' of input module 66. Through discharge outlet 37, hot gas 27 flows into input module 66, where it impacts upon filter assembly 65 in order to unfold its regenerating effect. In order to protect wall 67 of the input module against the high temperature of hot gas 27, one or more guard plates can be mounted in the region of wall section 67" or other suitable heat protection measures can be taken. These are not shown in FIG. 11 for the sake of clarity.

LIST OF REFERENCE NUMBERS

1 Wall
2 Combustion chamber
3 Outer pipe
4 Inner pipe
5 Open end
6 Combustion air pipe
7 Combustion zone
8 Bypass
9 Glow plug tube
10 Flame glow plug
11 Fuel channel
12 Glow pin
13 Orifice
14 Furnace combustion chamber
15 Combustion gas channel
16 Solenoid valve
17 Fuel
18 Scavenging air
19 Internal conduit
20 Holes
21 Mixing zone
22 Hot wire 23 Gap
24 Wire mesh
26 Flange
27 Hot gas
28 Combustion air blower
29 Solenoid valve
20 Diesel fuel supply pump
31 Power source
32 Switch
33 Burner
35 Combustion chamber
36 Closed end
37 Discharge outlet
38 Closed end
39 Combustion air
40 Air stream
41 Fuel supply
42 Air stream
43 Section
44 Longitudinal axis
45 Combustion gas
46 Diesel particulate filter system
47 Diesel engine
48 Y-tube
49 Particulate filter
50 Control unit
51 Processor
52 Program
53 Sensor (flame detector)
54 Temperature sensor
55 Current sensor
56 Casing
57 Outer wall
58 Flow baffle element
59 Bypass wall
60 Angle between 58 and 59
61 Combustion air gap
62 End of flow baffle element
64 Filter housing
65 Filter assembly
66 Input module
67 Wall of input module
67' Front wall of input module
68 Exhaust pipe
69 Exhaust gas stream
70 Diesel particulate filter
71 Bend

The invention claimed is:

1. Apparatus for producing hot gas comprising:
a) a first elongated wall portion having a shape like an oval having an inward curve on one side and defining a first bend at one end thereof and a first outlet at the other end thereof;
b) a second elongated wall portion having a shape like an oval within the first elongated wall portion and having an inward curve on one side spaced from the inward curve of the first wall portion, and defining a second bend juxtaposed to the first bend, and having a receiving space juxtaposed to the outlet, the inward curve of said second wall portion terminating spaced from the receiving space, said second elongated wall portion being juxtaposed to and spaced inwardly from the first wall portion to define a first continuous combustion chamber therebetween extending from the receiving space to the outlet;
c) a third elongated wall portion extending from a point juxtaposed to the space within the second bend to a point between the receiving space and the termination of the inward curve of said second wall portion wherein said third elongated wall portion includes a terminal portion that is bent back toward the termination of the inward curve of the second wall portion to subtend an acute angle, said terminal portion including a baffle terminating spaced from the first wall portion to define a gap therebetween,
d) said third wall portion juxtaposed to and spaced inwardly from the second wall portion to define a continuous by-pass passage therebetween that extends from the receiving space to the space at the second bend, and said third wall portion being spaced outwardly from the inward curve of said second wall portion to define a second combustion chamber that extends from an inlet at the space at the second bend to a second outlet at the termination of the inward curve of the second wall portion;
e) a first plate fixed to the lateral edges of the wall portions on one side thereof, and a second plate fixed to the lateral edges of the wall portions on the other side thereof to enclose the spaces between the wall portions with the wall portions extending between the plates;
f) a fuel inlet mounted on one of the plates terminating in an ignition device for introducing fuel into the space at the second bend to produce combustion gases in the second combustion chamber and,
g) an air inlet mounted on one of the plates for introducing combustion air into the receiving space wherein introduced air is divided by the third wall portion (1) to flow through the by-pass passage into the second combustion chamber and (2) to flow via said gap into the first continuous combustion chamber wherein it merges with combustion gases emerging from said second combustion chamber and diverted by said baffle into said second combustion chamber.

2. Apparatus according to claim 1 wherein the subtended angle is from about 45 degrees to about 90 degrees.

3. Apparatus according to claim 1 wherein the subtended angle is from about 55 degrees to about 70 degrees.

4. Apparatus according to claim 1 wherein the baffle is movable.

5. Apparatus according to claim 4 wherein a control element is engaged with the baffle to move its position relative to the first wall portion to set the width of the gap therebetween.

6. Apparatus according to claim 1 wherein the gap is between from about 5 mm to about 7 mm in width.

7. Apparatus according to claim 1 wherein a high surface area element is mounted on the inner periphery of the second combustion chamber.

8. Apparatus according to claim 7, wherein the high surface area element is selected from the group consisting of wire mesh, metal fabric, wire cloth, metal foam, ceramic foam, a knitted structure and combinations thereof.

9. Apparatus according to claim 1 wherein the first and second elongated wall portions are composed of a single integrated strip of steel as a continuous bent component.

10. Apparatus according to claim 1 wherein the fuel inlet and air inlet are mounted on the same plate.

11. Diesel particulate filter system comprising;
A particulate filter, and
an apparatus for producing hot gas according to claim 1 coupled to the particulate filter for passing said hot gas therethrough.

12. Diesel particulate filter system according to claim 11 wherein the particulate filter and the apparatus form an integrated structural unit.

13. Method for producing hot gas comprising the following steps:
   a) positioning a first elongated combustion chamber of kidney shape having a first bend at one end and a first outlet at its other end inside a second elongated combustion chamber of kidney shape having a second bend at its end juxtaposed to the first bend in the first combustion chamber and a second outlet at its other end;
   b) establishing an air passage from a point in the second elongated combustion chamber adjacent to but separated from the second outlet to the first bend for introducing air into the first elongated combustion chamber;
   c) establishing an air gap in the second elongated combustion chamber;
   d) feeding air into said second elongated combustion chamber adjacent but separated from said second outlet to create separate flows of air through the air passage and the gap;
   e) introducing and combusting fuel with a deficiency of oxygen in the first combustion chamber to create combustion gas and exiting same into said second combustion chamber;
   f) reversing the exiting flow of combustion gas from the first combustion chamber and merging with introduced air flowing through the gap;
   g) flowing the merged introduced air and exiting combustion gas through the second combustion chamber past the second bend to the second outlet of the second combustion chamber while continuing combustion; and
   h) exiting resulting oxygen-rich, fully combusted hot gas from the second outlet of the second combustion chamber.

14. Method according to claim 13 wherein the gap is between from about 5 mm to about 7 mm in width.

15. Method according to claim 13 including the step of adjusting the width of the gap.

16. Method according to claim 13 including the step of forming the first and second combustion chambers from a single continuous elongated strip of steel fixed to plates on opposite lateral edges.

17. Method according to claim 16 including the step of forming the air passage from a single continuous elongated strip of steel having at one end a reverse bend that subtends an acute angle.

18. Method according to claim 17 wherein the acute angle is from about 45 degrees to about 90 degrees.

19. Method according to claim 17 wherein the acute angle is from about 55 degrees to about 70 degrees.

20. Method according to claim 13 including the step of positioning a high surface element to capture fuel droplets occurring on account of Leydenfrost effect in the first combustion chamber, and flowing combustion gas over the high surface element to combust captured fuel droplets under oxygen-deficient conditions.

* * * * *